UNITED STATES PATENT OFFICE.

OTTO LIEBKNECHT, OF FRANKFORT-ON-THE-MAIN, GERMANY, ASSIGNOR TO DEUTSCHE GOLD- & SILBER- SCHEIDE-ANSTALT VORMALS RÖSSLER, OF FRANKFORT-ON-THE-MAIN, GERMANY, A CORPORATION OF GERMANY.

MANUFACTURE OF INDIGO LEUCO BODIES.

963,377.        Specification of Letters Patent.     Patented July 5, 1910.

No Drawing.      Application filed August 10, 1905. Serial No. 273,643.

*To all whom it may concern:*

Be it known that I, OTTO LIEBKNECHT, Ph. D., chemist, a citizen of the Empire of Germany, and residing at Frankfort-on-the-Main, Germany, have invented certain new and useful Improvements in the Manufacture of Indigo Leuco Bodies, of which the following is a specification.

This invention relates to that method of manufacturing indigo leuco-bodies wherein certain aromatic compounds, such as aromatic glycins, are condensed with aid of alkali amid in presence of caustic alkalies. It rests on the observation that the ammonia set free by the reaction between the alkali amid and the aromatic compound may be used for producing a further quantity of amid, so that relatively large quantities of the aromatic compounds may be condensed with expenditure of comparatively very little ammonia.

One method of operating according to the invention consists in introducing into the mass to be condensed a quantity of alkali amid insufficient for the purpose and a quantity of alkali metal equivalent to the balance of the alkali amid which would have been required for complete condensation. In this case the amid actually introduced starts the condensation and the ammonia thus liberated combines with alkali metal to produce more alkali amid, which in its turn effects condensation with liberation of ammonia, and so on until the condensation is complete. By another method of operating it is not necessary to add alkali amid to the mass at all, as instead there may be introduced a substance that yields ammonia in presence of the caustic alkali which the mass contains. Urea is an example of such a substance; it yields ammonia easily and without any troublesome secondary reactions. There being sufficient alkali metal in the mass to produce the necessary quantity of alkali amid, the substance, such as urea, decomposes and forms alkali amid and the condensation may proceed as already described. The preferred manner of operating, however, consists in introducing into the mass only alkali metal and supplying ammonia as such, so as to produce the necessary amid. The formation of amid and the condensation may thus occur together, ammonia, apparatus and time being thereby economized.

The operation is always conducted in presence of caustic alkali, preferably the readily fusible mixture of caustic soda and caustic potash.

The following example illustrates the preferred mode of operation:—1000 grams of a mixture of caustic potash and caustic soda are melted in a closed vessel having a stirrer, and the air is expelled from the vessel by ammonia. 120 grams of sodium are next introduced, followed by 425 grams of the potassium salt of phenylglycin added in small portions while ammonia is slowly introduced. When all the potassium salt of phenylglycin has been added, which occupies about ¾ of an hour, the heating is continued for a short time, more ammonia being introduced in order to complete the reaction. The best temperature is about 200° C. and the ammonia is advantageously introduced through a pipe which is inserted into the molten mass as far as the stirrer will allow. The speed of the current of ammonia is so regulated that during the time that the heating is maintained about 20 liters of the gas are introduced. This quantity of ammonia which is comparatively very small, may be probably still further reduced. Care should be taken that the leuco-body produced does not remain in contact with excess of alkali amid, as this is not favorable to the process.

Having now described my invention, what I claim is:—

1. The herein described process of making indoxyl, its homologues and their derivatives, which consists in heating aromatic compounds, capable of forming indigo leuco-bodies in an alkali-melt, with an alkali and alkali-metal to the temperature necessary for the formation of indoxyl, then reacting on the mixture with a substance having the property of forming with the alkali-metal a compound capable of eliminating or separating water from the mass, and afterward continuing to heat until the formation of the indigo leuco-bodies is completed.

2. The herein described process for the manufacture of indoxyl, its homologues and their derivatives, which consists in heating aromatic compounds, capable of forming indigo leuco-bodies in an alkali melt, with an alkali and an alkali-metal to the temperature necessary for the formation of indoxyl and reacting on the mixture with ammonia, having the property of forming with the alkali-metal alkali-amid capable of eliminating water from the mass, and afterward continuing to heat until the formation of the indigo leuco-bodies is completed.

3. The herein described process for the manufacture of indigo leuco-bodies, which consists in causing a molten caustic alkali to act in presence of an alkali-metal and an ammonia-yielding body, such as alkali-amid, on an indoxyl-yielding body.

In testimony, that I claim the foregoing as my invention, I have signed my name in presence of two subscribing witnesses.

OTTO LIEBKNECHT.

Witnesses:
WILHELM MICK,
JEAN GRUND.